April 25, 1939.                G. W. VON HOFE                2,156,134
MACHINE FOR HANDLING AND APPLYING SHEETS OF MATERIAL
               Filed Dec. 2, 1936          2 Sheets-Sheet 1
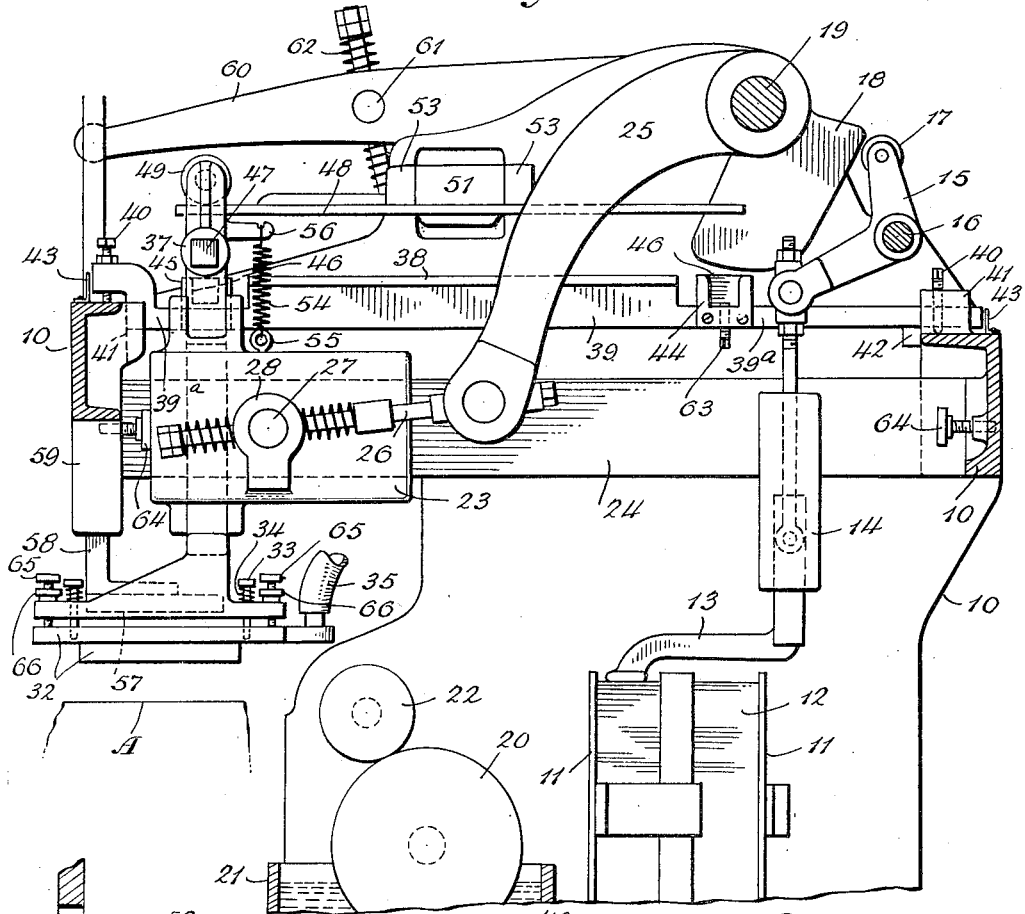
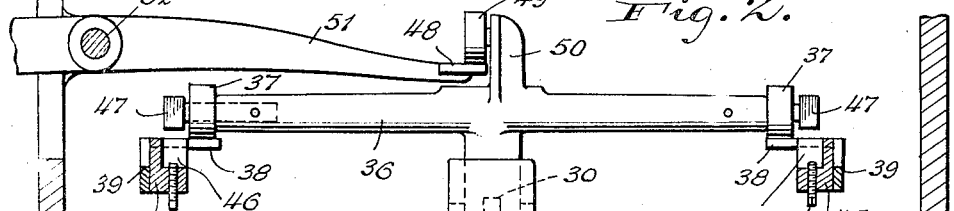
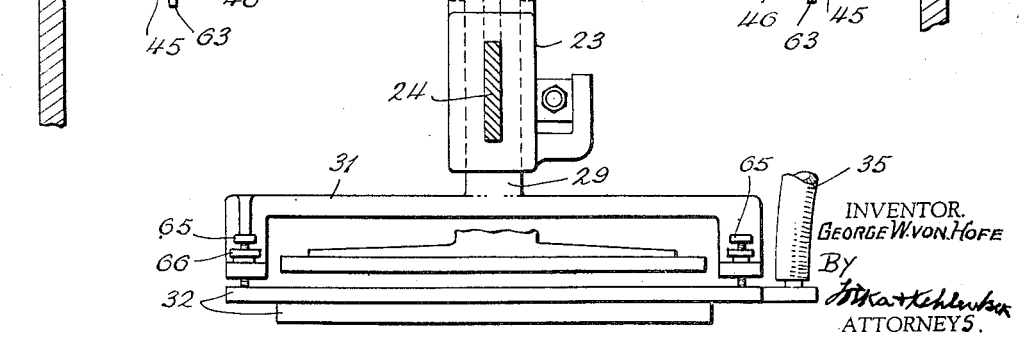
INVENTOR.
GEORGE W. VON HOFE
BY
ATTORNEYS.

April 25, 1939.   G. W. VON HOFE   2,156,134
MACHINE FOR HANDLING AND APPLYING SHEETS OF MATERIAL
Filed Dec. 2, 1936   2 Sheets-Sheet 2
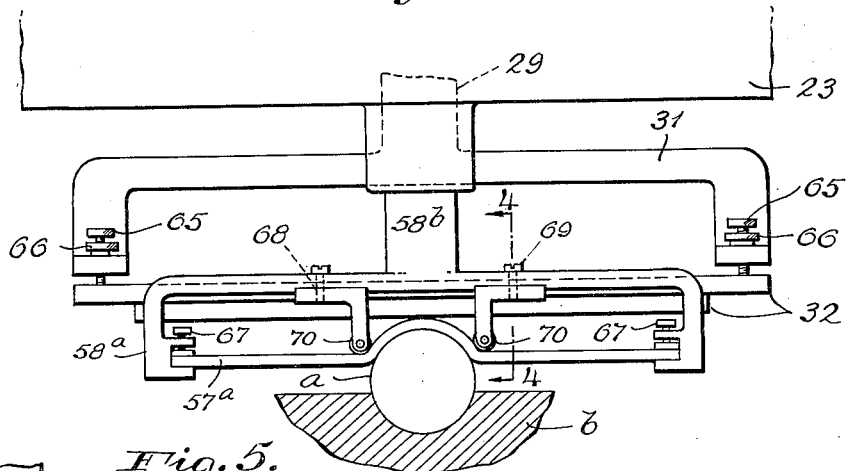
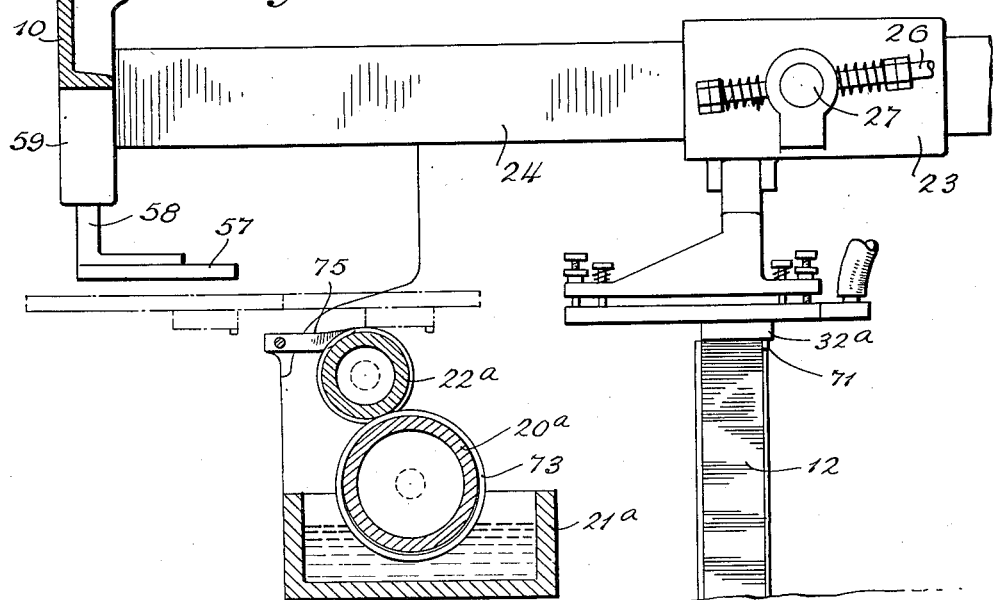
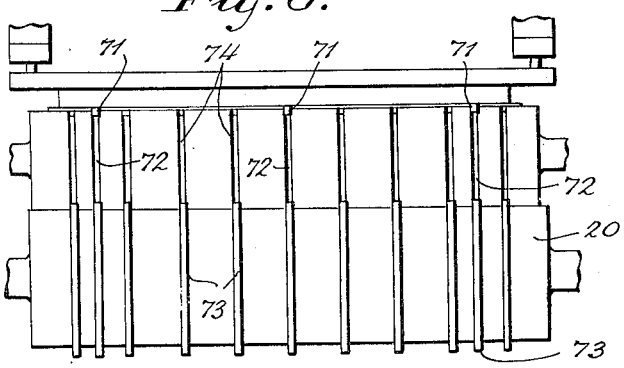
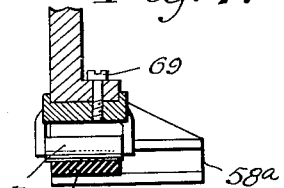
INVENTOR.
GEORGE W. VON HOFE
BY
ATTORNEYS.

Patented Apr. 25, 1939

2,156,134

UNITED STATES PATENT OFFICE 2,156,134

MACHINE FOR HANDLING AND APPLYING SHEETS OF MATERIAL

George W. von Hofe, Bound Brook, N. J., assignor to New Jersey Machine Corporation, Hoboken, N. J., a corporation of New Jersey Application December 2, 1936, Serial No. 113,797

29 Claims. (Cl. 216—55)

The invention relates to machines for handling and applying sheets of material as exemplified for instance by so-called labelling machines and has to do more particularly with that class of machines in which sheets of material, such as labels, are successively removed and transferred from supply stacks for adhesive application to the elements for which said sheets or labels are designed. The invention has for its object to improve the means whereby the sheets, labels or the like are individually handled and to provide novel means for efficiently applying the labels or their equivalent to the elements for which they are intended. Other more specific objects will appear from the description hereinafter and the features of novelty will be pointed out in the claims.

In the accompanying drawings which illustrate examples of the invention, without defining its limits, Fig. 1 is a fragmentary elevation with some parts in section, of a machine embodying the novel features; Fig. 2 is a fragmentary section thereof; Fig. 3 is a detail view illustrating a novel form of applying means; Fig. 4 is a detail section on the line 4—4 of Fig. 3; Fig. 5 is a fragmentary elevation showing another form of the novel transferring means, and Fig. 6 is a detail elevation thereof.

For the purpose of illustration and description and without any intent to define a limited field of usefulness, the novel features have been illustrated and described in connection with a labelling machine, it being understood that the term "label" as used hereinafter in the specification and claims is intended to include equivalent sheets of material.

As shown in Fig. 1 the machine includes a suitable frame 10 on which a container or hopper 11 of any conventional type is supported in any convenient manner for the purpose of containing a supply of labels in the form of an upright supply stack 12. Generally speaking, the bottom of the hopper 11 is vertically adjustable by means of suitable elevating mechanism automatically controlled in a manner to periodically restore the upper end of the stack 12 to a predetermined level. For the purpose of automatically controlling the elevating mechanism the machine may include a feeler 13 vertically slidable in an upright guide 14 and connected with a bell crank lever 15 pivoted at 16 upon the frame 10; the lever 15 carries a roller 17 adapted to be acted upon by a cam 18 to vertically adjust the feeler 13 in operative synchronism with the means whereby the labels are successively removed from the stack 12. The cam 18 is carried by a shaft 19 suitably journalled in the machine.

In addition the illustrated machine includes adhesive applying means consisting of a distributing roll 20 rotatably mounted in the machine and dipping into a supply of adhesive contained in a stationary container 21; the distributing roll 20 is located in tangential relation to an adhesive applying roll 22 suitably journalled in the machine in operative relation to the hopper 11 and stack 12 for the purpose to be more fully pointed out hereinafter.

The means whereby individual labels are successively removed from the upper end of the stack 12 and transferred therefrom for adhesive application to the elements for which the labels are designed is of the suction operated type and in its novel form consists of a carriage 23 slidably mounted upon a horizontal guide rail 24 suitably supported on the frame 10 of the machine, as clearly shown in Fig. 1; in the form illustrated the means whereby the carrier 23 is slidably reciprocated on the rail 24 comprises an arm 25 fixed upon the shaft 19 and having its one end pivotally connected with a coupling rod 26 which in turn is yieldingly and pivotally connected at 27 with a lug 28 forming part of or fixed upon the carriage 23 as shown in Figs. 1 and 2. It will be understood that the shaft 19 is rocked on its axis in properly timed relation with the other elements of the machine in any suitable and conventional manner. The carriage 23 serves as a support for the member 29 which is vertically slidable on said carriage 23 and is slotted at 30 for the accommodation of the rail 24 and at its lower end is provided with a yoke 31 in the form of a rectangular arch as illustrated in Fig. 2. A suction head 32 is mounted upon the yoke 31 for instance by means of headed bolts 33 and springs 34 whereby a tension is developed tending to draw the suction head 32 toward the yoke 31. The detailed construction of the suction head 32 may be of conventional type, the suction head 32 in any case being connected with a source of suction, for instance by means of a flexible tube 35; as the suction producing means per se forms no part of the instant invention, it has not been deemed necessary to illustrate the same in detail. At its upper end the member 29 is provided with a cross member 36 at the opposite ends of which rollers 37 are suitably journalled, said rollers 37 being adapted to travel upon rails 38 forming part of or carried by supports 39 adjustably mounted upon suitable portions of the frame 10, for instance by means of adjusting screws 40. The supports 39 are maintained in the intended location and vertically guided in guideways 41 formed in convenient parts of the frame 10 and in addition are provided with lugs 42 co-operating with the frame 10 to prevent lengthwise movements of the supports 39 in one direction, such movement in the opposite direction being prevented by the guideway 41 shown at the left-hand side of Fig. 1. The principal purposes of the adjusting devices exemplified by the screws 40 and their associated elements are to set the rails 38 in a level or other predetermined position and to adjust the suction surface of the head 32 relatively to the adhesive applying roll 22 as will be more fully set forth hereinafter; to facilitate this adjustment, indicating devices 43 may be provided adjacent to the opposite ends of the supports 39 which, if desired, may in such case be provided with co-operating scales or other designations. As shown in Fig. 1 the rails 38 are of less length than the reciprocating paths traversed by the rollers 37 which consequently at opposite terminals of their paths of travel are accordingly located beyond said rails 38 and in registry with relatively reduced portions 39ª with which said supports 39 are provided to permit the necessary vertical movements of the suction head 32 as will appear more fully hereinafter. Positioning members 44 and 45 are fixed upon the reduced portions 39ª of the supports 39 and are provided with upwardly open recesses 46 preferably of rectangular form and dimensioned to receive and fit rectangular blocks 47 when the suction head 32 occupies its lower position in the operation of the machine, said blocks 47 being located at opposite ends of the cross member 36, as illustrated in Fig. 2. In the operation of the mechanism the member 29 and yoke 31 is adapted to be vertically reciprocated to correspondingly move the suction head 32 into and out of engagement with the upper end of the stack 12 and with the elements to which the labels are to be applied. Any suitable means may be provided for effecting this vertical reciprocation in properly synchronized relation with the operations of the other parts of the machine. In the illustrated example the means in question is shown in the form of a horizontally extending track 48 upon which a roller 49 is adapted to travel, said roller 49 being journalled upon a lug 50 projecting upwardly from the cross member 36, as shown in Fig. 2. The track 48 is carried by a lever 51 pivoted at 52 in bearings 53 forming part of or secured to the frame 10, it being understood that any conventional mechanism may be provided for rocking said lever 51 on its pivot 52 as will be more fully set forth hereinafter; the track 48 is of sufficient length to extend throughout the horizontal path of movement of the suction head 32 and its associated elements in the performance of its operative functions. Gravity alone may be relied upon to bring about the downward movements of the suction head 32, yoke 31 and co-operating elements, although in the preferred arrangement a spring 54 is provided to assist such downward movements; the spring 54 has it one end secured to an eyelet 55 on the carriage 23 and its other end fastened to a projection 56 extending outwardly from the lug 50 as illustrated in Fig. 1. For the purpose of developing pressure upon the labels to cause them to firmly adhere to the elements for which they are designed, a presser foot or pressure member 57 is provided, said presser foot or pressure member 57 being carried by and extending transversely to a plunger 58 vertically slidable in a guideway 59 provided upon the frame 10 and together with said plunger 58 constituting a transversely-headed pressure member which projects into the arch of the yoke 31 when the latter is in the position illustrated in Fig. 1. Any suitable mechanism may be provided for vertically reciprocating the plunger 58 and with it the presser foot or pressure member 57; this mechanism as shown by way of example in Fig. 1 may consist of a lever 60 having its one end suitably connected with the plunger 58 and having its other end loosely mounted upon the shaft 19. The lever 60 as illustrated in Fig. 1 may be pivotally and resiliently connected at 61 with a connecting rod 62 which in such case may constitute a part of the means whereby said lever 60 is rocked upon the shaft 19, it being understood that the last named means may be of any suitable type and embodied in the machine in any convenient manner for operating in properly timed relation with the other mechanism.

In practice the mechanism so far described operates as follows, it being understood that in Fig. 1 of the drawings the parts are shown in the position occupied by the suction head 32 when in registry with the elements A to which the labels are to be applied, or in other words, when located at what may be termed the "applying station". In properly timed relation with the other elements of the machine, the lever 51 is actuated at this stage to lift the roller 49 and with it the member 29, yoke 31 and suction head 32 to a position above that shown in Fig. 1. As the shaft 19 is now rocked on its axis the lever 25 will be swung toward the right in Fig. 1 and accordingly will slidably pull the carriage 23 in the same direction lengthwise of the rail 24 until the suction head 32 is located above and in registry with the upper end of the stack 12. During these operative steps the cam 18 will partake of the rocking movement of the shaft 19 and by acting on the roller 17 will swing the bell crank lever 15 in a direction to raise the feeler 13 away from said upper end of the stack 12 to an inoperative position in which it does not interfere with the subsequent actuation of the suction head 32 in the removal of a terminal label from said stack 12. As the carriage 23 with the elements carried thereby is thus slidably moved to the right on the rail 24, the roller 49 will travel lengthwise of the track 48 to maintain the suction head 32 in a position in which it passes above the adhesive applying roller 22 and accordingly does not contact therewith; throughout a portion of such movement the rollers 37 will travel above the rails 38 but not in engagement therewith. At the terminus of this reciprocating movement toward the right the rollers 37 will be located beyond the right-hand ends of the rails 38 with the roller 49 however still in rolling engagement with the track 48 and with the rectangular blocks 47 in vertical registry with the recesses 46 of the positioning members 44. At the proper moment the lever 51 will be actuated to lower the track 48 and to correspondingly lower the member 29 and with it the yoke 31 and suction head 32 to bring the latter into engagement with the upper end of the stack 12; as these downward movements take place the rectangular blocks 47 will enter the recesses 46 and in co-operation therewith will accordingly automatically correct any inaccuracy in the transverse adjustment of the suction head 32 which may have developed and thereby assure a correct contact of the suction head 32 with the top of the stack 12; to still further guarantee such correct positioning of the suction head 32 relatively to the stack 12 and to automatically correct any longitudinal inaccuracy in the position of the head 32, the positioning members 44 and 45 may be provided with adjusting screws 63 which by engagement with the blocks 47 will effect the proper engagement of the aforesaid suction head 32 longitudinally with the stack 12. As the suction head 32 is brought into contact with the stack 12 suction will automatically be developed therein through the connecting tube 35 in any conventional manner so as to cause the terminal label at the upper end of the stack 12 to adhere to the suction head 32 in the well-known way. When the terminal label has thus been picked up from the stack 12 the lever 51 will be actuated to raise the track 48 and to thereby correspondingly raise the member 29, yoke 31 and suction head 32. At this stage the carriage 23 will be slidably shifted toward the left on the rail 24 and accordingly bring the rollers 37 over the rails 38 whereupon the lever 51 will be operated, if necessary, to lower the rollers 37 into contact with said rails 38. From this point on the position of the suction head 32 in its continued travel to the left in Fig. 1 is controlled by the rollers 37 and rails 38. As the latter are so adjusted that the distance between the upper surfaces of said rails 38 and the periphery of the adhesive applying roll 22 corresponds to the distance between said upper surfaces of the rails 38 and the lower surface of the suction head 32 the label carried by the suction head 32 will be caused to pass over and in tangential surface contact with the adhesive applying roll 22 whereby the one surface of said label is provided with a coating of adhesive. Continuing in its movement toward the left in Fig. 1 the carriage 23 will finally reach the position illustrated therein at which time the pressure member 57 will project into the arch of the yoke 31 and accordingly will not interfere with the adjustment of the suction head 32 to the position indicated; at the same time the rollers 37 will be located beyond the left-hand ends of the rails 38 with the roller 49 again in rolling engagement with the track 48 which has previously been adjusted in properly timed sequence to the proper position to receive said roller 49. When this has occurred the track 48 will again be lowered through the proper operation of the lever 51 and will correspondingly lower the member 29, yoke 31 and suction head 32 to cause the rectangular blocks 47 to enter the recesses 46 of the positioning members 45 and engage the adjusting screws 63 therein; in this way any inaccuracies in the positioning of the suction head which may have developed will again be corrected through the cooperation of the rectangular blocks 47 with the aforesaid recesses 46 and adjusting screws 63 of the positioning members 45. These operations of the mechanism will bring the suction head 32 with the label carried thereby into contact with the article A to which the label is to be adhesively applied, it being understood when this initial application has been completed that the suction in the suction head 32 is automatically cut off; because of the arched formation of the yoke 31, the aforesaid downward adjustment of the suction head 32 may be accomplished without interference by the pressure member 57. At the proper moment the track 48 is again moved upwardly to thereby raise the member 29, yoke 31 and suction head 32 away from the applied label which because of its adhesively coated surface adheres to the aforesaid article A, this upward movement being also made relatively to and without interference with the pressure member 57. The return movement of the carriage 23 and its associated elements to the right is then commenced and at the same time the presser foot or pressure member 57 is moved downwardly to develop a pressure upon the aforesaid label to complete the adhesive application thereof to the article A for which it is designed. When the application of the label has been completed the element A with the label applied thereto is removed from the applying station and replaced with another element in any convenient or well-known way. The aforesaid operations are repeated in the predetermined sequence throughout any given operative period of the machine.

In order to accurately position the suction head at the opposite ends of its reciprocating movements in proper registry respectively with the stack 12 and with the elements to which the labels are to be applied, adjustable abutments 64 may be located upon the frame 10 of the machine in the path of movement of the carriage 23 at opposite ends thereof as illustrated in Fig. 1.

To insure the most efficient application of the labels to the elements for which they are designed, particularly in cases where the labels and elements are of relatively large dimensions, it is desirable to provide for the accurate adjustment of the suction head 32 on the yoke 31. The illustrated arrangement accordingly includes a plurality of adjusting screws 65 carried by the yoke 31 and arranged to engage the suction head 32, lock nuts 66 being provided for securing said screws 65 against unintentional dislocation in their adjusted positions; the adjusting screws 65 engage the surface of the suction head 32 which is forced into and maintained in contact with said screws 65 by the action of the springs 34 on the headed bolts 33. It will be obvious by suitably manipulating the adjusting screws 65 that the suction head 32 may be leveled or otherwise accurately adjusted to bring its lower surface into the most efficient applying relation to the elements to which the labels are to be applied and also into accurate relation to the adhesive applying roll 22.

By providing the adjusting screws 40 for adjusting the positions of the rails 38, the horizontal travel of the suction head 32 may be so arranged during the traversing of the rails 38 by the rollers 37 that a most efficient and uniform coating of adhesive is applied to the label in its passage across and in contact with the adhesive applying roll 22. The co-operation of the rectangular blocks 47 with the recesses 46 of the positioning members 44 and 45 also insures an automatic correction in inaccurate positioning of the suction head 32 in a transverse direction, while the engagement of said blocks 47 with the screws 63 correspondingly levels and adjusts the suction head 32 in a longitudinal direction.

In practice the machine under discussion is utilized not only for adhesively applying labels or other equivalent to flat surfaces of the elements for which said labels are designed, but is also required to adhesively apply labels to curved surfaces exemplified by the cylindrical surfaces of containers such as cans, bottles and the like. To facilitate such application and to provide for a most efficient application of the labels the presser foot or pressure member 57 of Fig. 1 may be replaced by the arrangement illustrated in Fig. 3; in this form it is assumed that labels are being applied to a cylindrical element a such as a bottle, can or the like properly held in position at the applying station upon a suitable support b in any well-known way. In the form now under discussion the pressure member is of the same general type as the pressure member 57 of Fig. 1, but comprises a frame 58ª carried by a plunger 58ᵇ corresponding to the plunger 58 of Fig. 1 and mounted and operated in a similar manner. The frame 58ª carries depending members spaced apart in opposed registry between which a flexible pressure strip 57ª of rubber or other suitable material extends and to which said pressure strip 57ª is clamped so as to be fixed in place upon the frame 58ª in any convenient manner as for instance by means of clamping screws 67; with this arrangement the pressure strip 57ª spans the space between the depending members of the frame 58ª and is free to flex relatively thereto at its intermediate portion. The frame 58ª in addition is provided with carriers 68 slidably mounted on said frame 58ª and fixed in adjusted positions relatively to each other for instance by set screws 69; the members 68 in their illustrated form are in the shape of angle irons and carry rollers 70 at their depending ends. It will be understood that when the suction head 32 occupies a position corresponding to that shown in Fig. 1, the pressure member, in the form now being described, also projects into the arch of the yoke 31 and thus does not interfere with the shifting of the suction head 32 to the aforesaid position.

In using this type of construction the members 68 are adjusted on the frame 58ª to space the rollers 70 apart in accordance with the dimensions of the curved surfaces to which the labels are to be applied or in dependence upon the diametric dimensions of the article a, or in other words to predetermine the flexing area of the pressure strip 57ª or its equivalent. As the mechanism is operated to move the frame 58ª downwardly in the manner previously described with respect to the presser foot or pressure member 57, the flexible pressure strip 57ª will be brought into contact with the article a and as the downward movement continues will in co-operation with the rollers 70 be flexed into accurate conformity to said curved surface to apply pressure to all parts of the label whereby the latter is adhesively secured in place upon the article a in the most efficient manner. At the same time the rollers 70 develop localized positive pressure through the pressure strip 53ª on the label which localized pressure may be advantageously used at the edges of the label where the latter ofttimes tends to curl away from the article a. It is quite obvious that a presser foot or pressure member of the type shown at 57 in Fig. 1 will engage a curved surface or a cylindrical article such as a in tangential relation to said surface with the result that a considerable portion of the applied label will not be subject to any pressure at all; as a result the presser foot 57 operates most efficiently in applying labels or the like to flat or approximately flat surfaces. The arrangement shown in Fig. 3 on the other hand may be efficiently utilized for applying labels or the like to any surface regardless of its shape; as set forth above, the provision of the flexible pressure strip 57ª assures accurate and complete conformation with a curved or other surface throughout the entire surface area of the particular label being applied to said surface and accordingly applies pressure thereto in a uniform and efficient manner.

In many instances machines of the character disclosed herein are used for applying relatively long and narrow labels as exemplified for instance by conventional internal revenue stamps. Because of the narrowness and length of such labels the latter very often become displaced upon the suction head, particularly when passed thereby in tangential surface engagement with an adhesive applying roll; as a result of such displacement the label is not brought into proper relation to the article to which it is to be applied and accordingly is often improperly and inaccurately positioned thereon as will be evident. To overcome this difficulty the suction head 32ª which in such case may include a relatively long and narrow section is provided with one or more projections 71 depending from its lower surface adjacent to its one longitudinal edge as shown in Figs. 5 and 6. When the suction head 32ª is operated to pick up the terminal label from the stack 12, the projections 71 will engage the one longitudinal edge of said label at spaced intervals and accordingly will fix said label against any unintentional dislocation on the lower surface of the suction head 32ª. To properly accommodate the projections 71 as the suction head 32ª with the label carried thereby passes in tangential surface contact with the adhesive applying roll, the roll 22ª which corresponds to the roll 22 of Fig. 1, is provided with circumferential grooves 72 located in the path of the projections 71 and dimensioned so as to permit said projections 71 to pass through the same as is illustrated in Fig. 6. In this form of the device the adhesive distributing roll 20ª which corresponds to the roll 20 of Fig. 1 likewise dips into a supply of adhesive in a stationary container 21ª similar to the container 21 shown in the form first described. To prevent adhesive which is distributed by the roll 20ª to the roll 22ª from filling the grooves 72, the roll 20ª is likewise provided with circumferential grooves in registry with the grooves 70 and accommodating rings 73 which are loosely mounted in the grooves of the roll 20ª and enter the grooves 72 of the roll 22ª at the point of contact or nearest approach of the two rolls 20ª and 22ª.

To forestall the possibility of the labels adhering to the adhesive applying roll 22ª, the latter may be provided with a plurality of additional circumferential grooves 74 for the accommodation of fingers or take-off members 75 suitably fixed upon the machine and projecting into the grooves 74 as clearly shown in Fig. 5. In such case additional rings 73 are loosely mounted in circumferential grooves on the adhesive distributing roll 20ª so as to project into the groove 74 to prevent adhesive from accumulating therein.

While the arrangement last described is designed particularly for use in connection with relatively long and narrow labels, it may be used with equal efficiency in connection with all types and sizes of labels or their equivalent. In any case the labels will be positively held against displacement on the suction head 32ª and will likewise be prevented from adhering to the adhesive applying roll 22ª. It will be understood that the mechanism shown in Fig. 5 may otherwise be constructed and operated in the same way as illustrated in Fig. 1 and described with respect thereto; it will be obvious however that the novel features illustrated in Figs. 5 and 6 are not restricted in their use to the specific machine first described herein.

The novel arrangements and mechanisms illustrated and described herein are simple in construction and are of maximum efficiency in operation without requiring any particular skilled supervision and automatically guarantee uniform and satisfactory results in the handling, transferring and application of labels or their equivalent to the articles for which said labels or their equivalent are designed, without regard to the dimensions and shape of such articles.

Various changes in the specific forms shown and described may be made within the scope of the claims without departing from the spirit of the invention.

I claim:

1. In a machine of the kind described, the combination of a container for a supply stack of labels, and adhesive applying roll located in operative relation to said supply stack, a fixed horizontal guide rail located above and extending across said adhesive applying roll, a pair of spaced parallel rails located at a predetermined distance above said adhesive applying roll, means for adjusting said parallel rails to selectively vary said distance, a carriage slidably mounted upon said fixed guide rail, supporting means mounted on said carriage and vertically slidable thereon, a suction head carried by said supporting means, means for adjusting said suction head relatively to said supporting means, rollers journalled on said supporting means and adapted to traverse said spaced parallel rails, the distance between the peripheries of said rollers and the suction surface of said suction head corresponding to the distance between said spaced parallel rails and said adhesive applying roll minus the thickness of a label and the adhesive coating on said applying roll, means for reciprocating said carriage lengthwise of said fixed rail to move a label carried by said suction head in tangential contact with said adhesive applying roll during an operative movement of said carriage on said fixed rail, a track extending beyond said spaced rails at opposite ends thereof, a roller carried by said supporting means, and a pivotally actuated lever carrying said track and adapted to raise and lower the same and in co-operation with said last named roller to move said suction head into and out of contact with said supply stack to remove a terminal label therefrom, and to cause said suction head to apply said label to an article, and to raise said suction head above the level of said adhesive applying roll during an inoperative return movement of said carriage on said fixed rail.

2. In a machine of the kind described, the combination of a container for a supply stack of labels, an adhesive applying roll located in operative relation to said supply stack, a fixed horizontal guide rail located above and extending across said adhesive applying roll, a pair of spaced parallel rails located at a predetermined distance above said adhesive applying roll, means for adjusting said parallel rails to selectively vary said distance, a carriage slidably mounted upon said fixed guide rail, supporting means mounted on said carriage and vertically slidable thereon, a suction head carried by said supporting means, means for adjusting said suction head relatively to said supporting means, rollers journalled on said supporting means and adapted to traverse said spaced parallel rails, the distance between the peripheries of said rollers and the suction surface of said suction head corresponding to the distance between said spaced parallel rails and said adhesive applying roll minus the thickness of a label and the adhesive coating on said applying roll, means for reciprocating said carriage lengthwise of said fixed rail to move a label carried by said suction head in tangential contact with said adhesive applying roll during an operative movement of said carriage on said fixed rail, and means for vertically reciprocating said supporting means on said carriage to move said suction head into and out of contact with said supply stack to remove a terminal label therefrom, and to cause said suction head to apply said label to an article, and to raise said suction head above the level of said adhesive applying roll during an inoperative return movement of said carriage on said fixed rail.

3. In a machine of the kind described, the combination of a container for a supply stack of labels, an adhesive applying roll located in operative relation to said supply stack, a fixed horizontal guide rail located above and extending across said adhesive applying roll, a pair of spaced parallel rails located at a predetermined distance above said adhesive applying roll, carrying means slidably mounted on said fixed rail, a suction head carried by said carrying means and vertically slidable relatively thereto, traction members movable with said suction head and co-operating with said spaced parallel rails to support the suction surface of said suction head at the level of said adhesive applying roll, means for reciprocating said carrying means lengthwise of said fixed rail to move a label carried by said suction head in tangential contact with said adhesive applying roll during an operative movement of said carrying means on said fixed rail, and means for vertically reciprocating said suction head relatively to said carrying means to move said suction head into and out of contact with said supply stack to remove a terminal label therefrom, and to cause said suction head to apply said label to an article, and to raise said suction head above the level of said adhesive applying roll during an inoperative return movement of said carrying means on said fixed rail.

4. In a machine of the kind described, the combination of a container for a supply stack of labels, an adhesive applying roll located in operative relation to said supply stack, a horizontally reciprocable and vertically movable suction head, means for supporting the suction surface of said suction head at the level of said adhesive applying roll whereby a label carried by said suction head is moved in tangential contact with said adhesive applying roll during an operative horizontal reciprocating movement of said suction head, and means for vertically actuating said suction head to move it into and out of contact with said supply stack to remove a terminal label therefrom, and to cause said suction head to apply said label to an article, and to raise said suction head above the level of said adhesive applying roll during an inoperative horizontal return movement of said suction head.

5. In a machine of the kind described, the combination of a container for a supply stack of labels, an adhesive applying roll located in operative relation to said supply stack, a fixed horizontal guide rail located above and extending across said adhesive applying roll, a pair of spaced parallel rails located at a predetermined distance above said adhesive applying roll, carrying means slidably mounted on said fixed rail, a suction head carried by said carrying means and vertically slidable relatively thereto, traction members movable with said suction head and co-operating with said spaced parallel rails to support the suction surface of said suction head at the level of said adhesive applying roll, means for reciprocating said carrying means lengthwise of said fixed rail to move a label carried by said suction head in tangential contact with said adhesive applying roll during an operative movement of said carrying means on said fixed rail, means for vertically reciprocating said suction head relatively to said carrying means to move said suction head into and out of contact with said supply stack to remove a terminal label therefrom, and to cause said suction head to apply said label to an element, and to raise said suction head above the level of said adhesive applying roll during an inoperative return movement of said carrying means on said fixed rail, positioning members fixed on said spaced parallel rails and provided with upwardly open rectangular recesses, adjustable projections at the bottoms of said recesses, and rectangular blocks on said carrying means adapted to fit into said recesses and engage said adjustable projections when said suction head is moved downwardly on said carrying means, said blocks co-operating with said recesses and adjustable projections to automatically correct inaccuracy in the position of said suction head.

6. In a machine of the kind described, the combination of a container for a supply stack of lables, an adhesive applying roll located in operative relation to said supply stack, a horizontally reciprocable and vertically movable suction head, means for supporting the suction surface of said suction head at the level of said adhesive applying roll whereby a label carried by said suction head is moved in tangential contact with said adhesive applying roll during an operative horizontal reciprocating movement of said suction head, means for vertically actuating said suction head to move it into and out of contact with said supply stack to remove a terminal label therefrom, and to cause said suction head to apply said label to an element, and to raise said suction head above the level of said adhesive applying roll during an inoperative horizontal return movement of said suction head, positioning means on said supporting means, and positioning devices vertically movable with said suction head and co-operating with said positioning means to automatically correct inaccuracy in the position of said suction head when the latter is moved downwardly.

7. In a machine of the kind described, the combination of a container for a supply stack of labels, a suction head reciprocable over a given path, means for operating said suction head relatively to said given path at one terminal thereof to remove successive terminal labels from said stack, and at the other terminal of said path to apply said labels to successive articles, and means for correcting inaccuracies in the label removing position of said suction head relatively to said stack and in the label applying position relatively to said articles respectively.

8. In a machine of the kind described, the combination of a container for a supply stack of labels, a horizontally reciprocable carriage, a suction head mounted on said carriage and movable therewith to a label removing position and a label applying position at opposite terminals of said horizontal reciprocation respectively, said suction head being vertically movable relatively thereto, means for vertically actuating said suction head at said opposite terminals of its horizontal reciprocation to remove a terminal label from said stack and apply it to an article respectively, and means operative at the terminals of said horizontal reciprocation for correcting inaccuracies in the label removing position of said suction head relatively to said stack and in the label applying position relatively to said article respectively.

9. In a machine of the kind described including means for adhesively applying a label or the like to an article, that improvement which comprises a movable pressure device including supporting members in fixed spaced relation to each other, and a flexible pressure member having its opposite ends secured to said supporting members and spanning the space between the same, said pressure member applying pressure to the applied label and coincidentally conforming itself to the surface on which the label is located whereby the pressure of said pressure member is uniformly applied throughout the entire surface of said label.

10. In a machine of the kind described including means for adhesively applying a label or the like to an article, that improvement which comprises a movable pressure frame, a flexible pressure member attached to said pressure frame at spaced points thereof and spanning the space between said points for applying pressure to the applied label and means for coincidentally predetermining the flexing area of said pressure member in conformity with the dimensions and form of the surface on which said label is located whereby the pressure of said pressure member is uniformly applied throughout the entire surface of said label and for developing localized positive pressure on said label at opposite limits of said flexing area.

11. In a machine of the kind described including means for adhesively applying a label or the like to an article, that improvement which comprises a movable pressure frame, a flexible pressure member attached to said pressure frame at spaced points thereof and spanning the space between said points for applying pressure to the applied label and adjustable means for predetermining the flexing area of said pressure member in conformity with the dimensions and form of the surface on which said label is located whereby the pressure of said pressure member is uniformly applied throughout the entire surface of said label and for developing localized positive pressure on said label at opposite limits of said flexing area.

12. In a machine of the kind described including means for adhesively applying a label or the like to an article, that improvement which comprises a movable pressure frame including spaced members, a flexible pressure member carried by said frame and spanning the space between said members, said pressure member being arranged to apply pressure to the applied label and by its flexibility to coincidentally conform itself to the surface on which said label is located whereby the pressure of said pressure member is uniformly applied throughout the entire surface of said label, and means for predetermining the flexing area of said pressure member effective on said label and for coincidentally developing localized positive pressure at opposite limits of said flexing area.

13. In a machine of the kind described including means for adhesively applying a label or the like to an article, that improvement which comprises a movable pressure frame, a flexible pressure member having its opposite ends connected with said frame and having an intermediate free portion arranged to apply pressure to the applied label and members adjustably mounted on said frame for predetermining the flexing area of the intermediate free portion of said pressure member in conformity with the dimensions and form of the surface on which the label is located whereby the pressure of said pressure member is uniformly applied throughout the entire surface of said label, and for developing localized positive pressure on said label at opposite limits of said flexing area.

14. In a machine of the kind described including means for adhesively applying a label or the like to an article, that improvement which comprises a vertically movable pressure frame, a flexible pressure strip carried by said frame and arranged to apply pressure to the applied label, and members slidably mounted on said frame and adjustable toward and away from each other for predetermining the flexing area of said pressure strip in conformity with the dimensions and form of the surface on which said label is located whereby the pressure of said pressure strip is uniformly applied throughout the entire surface of said label.

15. In a machine of the kind described including means for adhesively applying a label or the like to an article, that improvement which comprises a vertically movable pressure frame, a flexible pressure strip carried by said frame and arranged to apply pressure to the applied label, carriers mounted on said frame above said flexible strip and adjustable toward and from each other in parallel relation to said strip, said carriers having depending members projecting toward said strip, and rollers carried by said depending members in engagement with said strip for predetermining the flexing area of the latter in conformity with the dimensions and form of the surface on which said label is located whereby the pressure of said pressure strip is uniformly applied throughout the entire surface of said label.

16. In a machine of the kind described, the combination of a supply stack of labels, a reciprocable suction head arranged to successively remove terminal labels from said stack and transfer the same therefrom for application to an article, and means rigidly fixed on said suction head for positioning said labels on the carrying surface of said suction head and for maintaining said labels against displacement from said position subsequent to removal from said stack.

17. In a machine of the kind described, the combination of a supply stack of labels, a reciprocable suction head arranged to successively remove terminal labels from said stack and transfer the same therefrom for application to an article, means rigidly fixed on said suction head for positioning said labels on the carrying surface of said suction head and for maintaining said labels against displacement from said position subsequent to removal from said stack, and an adhesive applying roll arranged to apply a coating of adhesive to said labels during transfer by said suction head, said adhesive applying roll being constructed to accommodate said maintaining means whereby interference with the reciprocation of said suction head during application of the adhesive coating is avoided.

18. In a machine of the kind described, the combination of a supply stack of labels, a reciprocable suction head arranged to successively remove terminal labels from said stack and transfer the same therefrom for application to an article, projections rigidly fixed on and depending from the carrying surface of said suction head for positioning said labels on said carrying surface and for maintaining said labels against displacement from said position subsequent to removal from said stack, and an adhesive applying roll arranged to apply a coating of adhesive to said labels during transfer by said suction head, said roll being provided with circumferential grooves in registry with the path of travel of said projections for accommodating the same whereby interference with the reciprocation of said suction head during application of the adhesive coating is avoided.

19. In a machine of the kind described, the combination of a supply stack of labels, a reciprocable suction head arranged to successively remove terminal labels from said stack and transfer the same therefrom for application to an article, projections rigidly fixed on and depending from the carrying surface of said suction head for positioning said labels on said carrying surface and for maintaining said labels against displacement from said position subsequent to removal from said stack, an adhesive applying roll arranged to apply a coating of adhesive to said labels during transfer by said suction head, said roll being provided with circumferential grooves in registry with the path of travel of said projections for accommodating the same whereby interference with the reciprocation of said suction head during application of the adhesive coating is avoided, an adhesive distributing roll in tangential delivery relation to said adhesive applying roll, and means on said distributing roll for preventing accumulation of adhesive in the grooves of said applying roll.

20. In a machine of the kind described, the combination of a supply stack of labels, a reciprocable suction head arranged to successively remove terminal labels from said stack and transfer the same therefrom for application to an article, projections rigidly fixed on and depending from the carrying surface of said suction head for positioning said labels on said carrying surface and for maintaining said labels against displacement from said position subsequent to removal from said stack, an adhesive applying roll arranged to apply a coating of adhesive to said labels during transfer by said suction head, said roll being provided with circumferential grooves in registry with the path of travel of said projections for accommodating the same whereby interference with the reciprocation of said suction head during application of the adhesive coating is avoided, an adhesive distributing roll in tangential delivery relation to said adhesive applying roll and provided with circumferential grooves in registry with the circumferential grooves of said adhesive applying roll, and rings loosely mounted in the grooves of said distributing roll and projecting into the grooves of said applying roll whereby accumulation of adhesive in the last named grooves is prevented.

21. In a machine of the kind described, the combination of a support for an article to be labelled, a transversely-headed pressure member reciprocably mounted above said support, an arched yoke reciprocable over a given path, a suction head carried by said yoke and movable therewith to a label applying position, said yoke arranged to straddle the head of said pressure member to bring said last mentioned head into superimposed spaced parallel relation to said suction head when the latter is in label applying position and said pressure member adapted to press the applied label in place after the removal of said suction head.

22. In a machine of the kind described, the combination of a support for an article to be labelled, a transversely-headed pressure member reciprocably mounted above said support, a horizontally reciprocable carriage, an arched yoke mounted on said carriage and vertically movable relatively thereto, a suction head carried by said yoke and movable therewith to a label applying position, said yoke arranged to straddle the head of said pressure member to bring said last-mentioned head into superimposed spaced parallel relation to said suction head when the latter is in label applying position, means for vertically operating said yoke and suction head in said label applying position to apply a label, and means for operating said pressure member to press the applied label in place after the removal of said suction head.

23. In a machine of the kind described, the combination of reciprocable carrying means, a suction head adjustably carried by said carrying means and movable therewith to a label applying position, and levelling means for adjusting the suction head on said carrying means to level the applying surface of said suction head at will.

24. In a machine of the kind described, the combination of a carriage movable over a given path, a yoke mounted on said carriage and movable therewith over said given path, a suction head, resilient means whereby said suction head is resiliently mounted on said yoke, and predetermining screws for adjusting the position of said suction head on said yoke effected by said resilient means.

25. In a machine of the kind described, the combination of a container for a supply stack of labels, a support for articles to be labeled, a suction head, means for shifting said head into label removing position relatively to said stack and into label applying position relatively to said articles and for operating said suction head at said positions respectively to remove successive terminal labels from said stack and to apply said labels to said articles, and means effective at one of said positions of the suction head to correctly predetermine the setting of the active face of said suction head at said position.

26. In a machine of the kind described, the combination of a container for a supply of labels, an adhesive applying roll having a permanent location in said machine, a suction head reciprocable to transfer successive labels from said supply into tangential contact with said adhesive applying roll and subsequently to an applying station, and means for shifting said suction head into and out of contact with said supply of labels to remove individual labels therefrom in succession and to cause said suction head to apply each label to an article, and to adjust said suction head to a non-contacting position relatively to said adhesive applying roll prior to a subsequent recovery movement of said suction head.

27. In a machine of the kind described, the combination of a container for a supply of labels, a support for holding an article to be labeled at an applying station, adhesive applying means having a permanent location between said label supply and applying station, a travelling label carrier arranged to transfer successive labels from said supply into adhesive receiving contact with said adhesive applying means and subsequently to said applying station, and means for shifting said label carrier into and out of contact with said supply of labels to remove individual labels therefrom in succession and to cause said carrier to apply each label to an article at said applying station, and to adjust said label carrier to a non-contacting position relatively to said adhesive applying means prior to a recovery movement of said label carrier toward said label supply.

28. In a machine of the kind described, the combination of adhesive applying means having a permanent location in said machine, a travelling label carrier having an operative path including said adhesive applying means whereby a label carried by said carrier is conveyed into adhesive receiving contact with said adhesive applying means, and means for adjusting said label carrier to a non-contacting position relatively to said adhesive applying means prior to a recovery movement of said label carrier.

29. In a machine of the kind described, the combination of a support for an article to be labelled, a flexible pressure member for developing a yielding pressure on an adhesive coated label to adhesively apply said label to said article, and means co-operating with said flexible member at spaced points thereof to develop localized positive pressure on predetermined portions of said label.

GEORGE W. von HOFE.